April 19, 1949.　　O. A. HANSEN ET AL　　2,467,428
PORTABLE CONTAINER FOR LIQUEFIED GASES
Filed Jan. 17, 1945

INVENTORS
ODD A. HANSEN
WALLACE J. ANDERSON
BY
ATTORNEY

Patented Apr. 19, 1949

2,467,428

UNITED STATES PATENT OFFICE 2,467,428

PORTABLE CONTAINER FOR LIQUEFIED GASES

Odd A. Hansen and Wallace J. Anderson, Kenmore, N. Y., assignors to The Linde Air Products Company, a corporation of Ohio Application January 17, 1945, Serial No. 573,186

6 Claims. (Cl. 220—15)

This invention relates to double walled portable containers for transporting and storing liquefied gases at very low temperatures, and more specifically to a container for the aerial transportation of liquefied gases such as liquid oxygen held at temperatures below 273° K.

The invention has for its object generally the provision of improved means for supporting the inner liquid holding vessel of a portable container in relation to an outer enclosing shell that provides an evacuated insulating space around the liquid holding vessel, said supporting means providing adequate support for the inner vessel in any position of the container without imposing undue local stresses in the walls of either the inner vessel or outer shell and only a small additional heat transfer across such insulating space.

Other more specific objects of the invention are: to provide in a container for the aerial transportation of liquefied gases held at low temperatures, means for supporting an inner liquid holding vessel within an evacuated outer shell: which adequately supports the inner vessel when the container is positioned upside down, on either side, or on either end as well as when in the normal position; which so supports the inner vessel by the use of a minimum of six tension members so that the heat conduction due to the supporting means is low; which so supports the inner vessel that forces tending to produce relative rotation between the inner vessel and the outer shell are adequatly countracted; and which is so constructed that the dead weight of the container for a given liquid holding capacity is small.

These and other objects and novel features of the invention will be more fully described in the following specification in connection with the accompanying drawing, in which.

Figure 1:
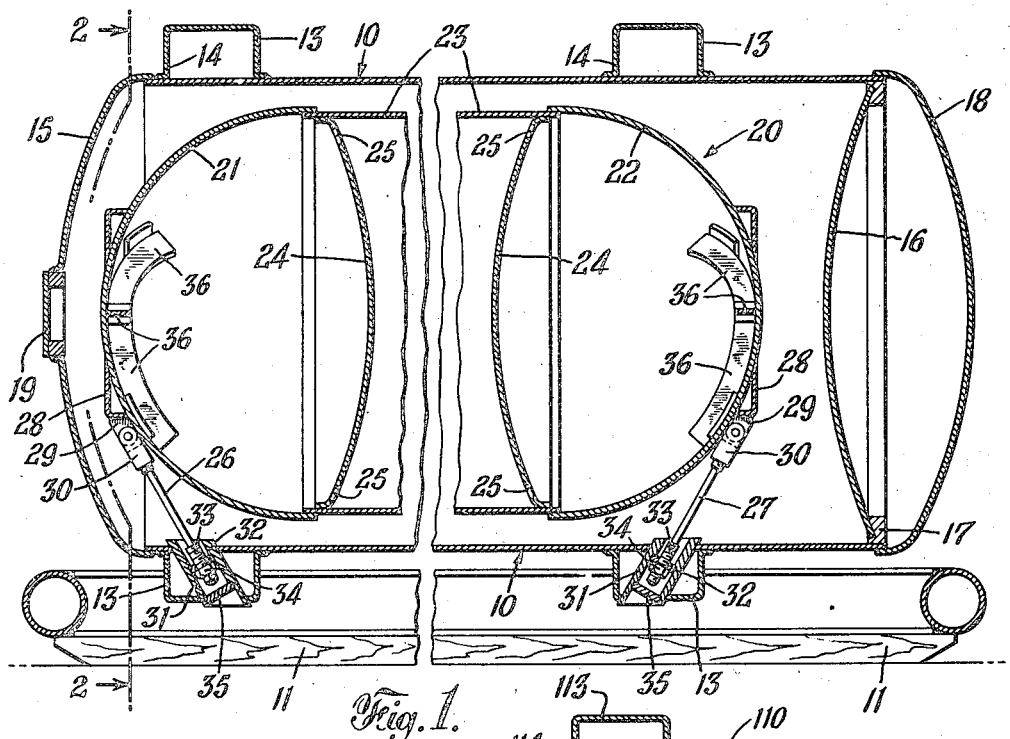
Fig. 1 is a view of a longitudinal section through an exemplary container embodying the principes of the present invention.
Figure 2:
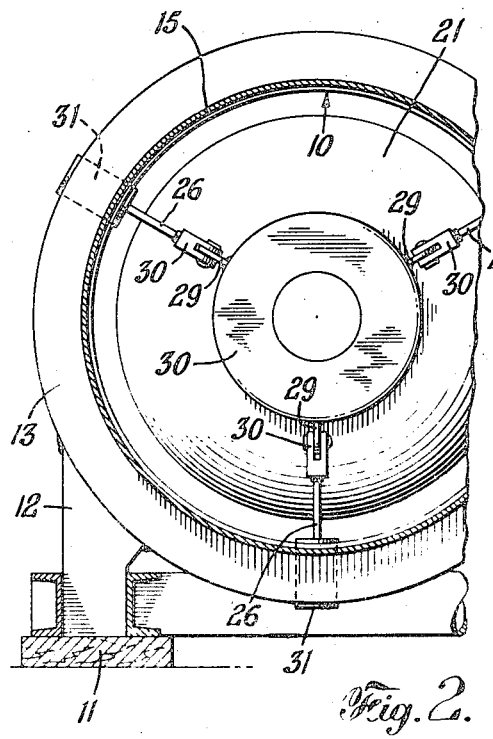
Fig. 2 is a view of a section taken along the line 2—2 of Fig. 1.

Referring now to the drawings and particularly to Figs. 1 and 2, the container includes preferably a cylindrical outer shell 10, the main axis of which is normally horizontal although it could, if desired, be normally vertical. The shell is mounted on suitable supporting means such as a skid frame 11 to which the shell 10 is secured by suitable means such as legs 12. The shell 10 is also provided with two or more reenforcing rings in the form of channels 13 which engirdle the shell 10 near its ends. The channel rings 13 preferably have their flange portions 14 inwardly directed and welded to the shell 10. The legs 12 are thus preferably welded to and extend downwardly from the channels 13. The ends of the shell 10 are closed by heads 15 and 16 may be externally convex or externally concave. In the embodiment of Fig. 1, the head 15 is convex and has a conventional dished contour. The rim of the head 15 is welded to the end of the cylindrical shell 10 to form a gas-tight joint. The head 16 is concave and has a reenforcing rim 17 welded to its edges, the rim 17 being fitted within the end of the shell 10 and gas-tightly secured thereto by welding, brazing, or hard soldering. An advantage of employing a concave construction for the head 16 is, that a convenient space is provided on the external concave side for mounting valves and instruments. Such valves and instruments can be protected by providing a cover 18 of externally convex or other desired shape which is removably mounted thereon. The head 15 is also preferably provided with a sealable handhole or manhole 19.

Disposed within the shell 10 is a liquid holding vessel indicated generally by the reference numeral 20. The inner vessel may be spherical or it may be cylindrical, the cylindrical form being illustrated. When the cylindrical form is employed as illustrated, the end heads 21 and 22 may be of dished shape or hemispherical. The heads 21 and 22 are joined by a cylindrical section 23 of suitable length to provide the desired liquid holding capacity. The heads are joined at their rims to the ends of the cylindrical section 23 preferably by welding in a gas-tight manner. In a cylindrical vessel it may usually be desirable to provide one or more transverse baffles to minimize excessive liquid movements, for example, baffles 24 having openings 25 in their normally upper and lower portions may be provided. The baffles 24 are preferably of dished shape so that they may be made of lighter material, and yet provide sufficient resistance to liquid movement.

The vessel 20 is supported within the shell 10 with its main axis substantially coinciding with the main axis of the shell, by tension members or load rods 26 and 27 arranged in two groups, one group of members 26 being secured to the head 21, and the other group of members 27 being secured to the head 22. A plurality of load rods are employed in each group and preferably the number in each group is three, although if more are employed each individual rod can be lighter. The load rods 26 are radially equally spaced apart as illustrated in Fig. 2, and are secured to the head 21 at points spaced preferably equally from the main axis of the vessel. The means for securing the load rods 26 to the head 21 comprises a ring member 28 that is concentric with the main axis of the vessel and is welded to the outer wall of the head 21. The outer rim of the ring member 28 has secured thereto three ears 29 that project radially. Pivotally secured to each ear 29 is a clevis 30 to which one end of one of the load rods 26 is secured. The load rods 26 are arranged to correspond to the elements of a conical surface which has its axis substantially coinciding with the main axis of the vessel and the shell 10. The outer ends of the rods 26 incline toward the rods 27, and are secured to the shell 10 by suitable means which preferably permits adjustment of the tension of the rods to be made externally and is also sealable gas-tightly.

The securing means for each rod comprises a sleeve 31 that extends through the shell 10 at the same angle as the rod 26 and is welded gas-tightly thereto. Intermediate of the ends of the sleeve 31 there is secured a transverse partition 32 having a threaded hole therethrough which engages threads 33 formed at the end of the rod 26. The connection of the rod 26 and clevis 30 may also be threaded and by employing right- and left-hand threads at the opposite ends of the rod 26, it will be possible to adjust the active length and tension in the rods by turning them. A lock nut 34 is preferably provided to prevent further turning of the rods after adjustment. Alternatively, the rods 26 may be fixed to the clevises 30, the partition 32 may have a clearance hole therethrough and adjustment of the rods be accomplished simply by using a self-locking type of nut 34. These sleeves 31 are preferably closed gas-tightly by a cover 35 which may be soldered into place. The sleeves are preferably located at points of the shell 10 where the shell is reenforced by the channels 13, the sleeves 31 passing through the web of the channels and being welded thereto.

Means for additionally reenforcing the ends of the inner vessel may be provided in the form of three radial ribs 36 which are secured to the inside wall of the heads 21 and 22. The ribs are preferably aligned with the rod securing ears 29. The rods 27 are mounted at the opposite end of the vessel in the same manner as are the rods 26 except that the outer ends of the rods 27 incline toward the rods 26, the angle of inclination of the rods 26 and 27 being of the same degree. Similar parts therefore carry the same reference numerals.

The container is customarily provided with means such as pipes connected to the inner vessel 20 and passing gas-tightly through the head 16 for filling and discharging liquid from the vessel and for releasing gas from the vessel. Connections are also provided for a liquid level measuring device and for a gas-pressure gauge and gas-relief valve. Such auxiliary apparatus may be of conventional type and arrangement and therefore is not illustrated in the interests of clearness of the drawing.

From the above description, it will be seen that each end of the liquid vessel is supported by three equally spaced suspension members or load rods from the outer casing 10, which casing is made gas-tight so that the space between the shell and the inner vessel can be evacuated for heat insulation purposes. The inner end of each load rod is secured to the head of the liquid vessel at a substantial radial distance from the main axis of the liquid vessel. This provides effective resistance to forces tending to rotate the liquid vessel about its main axis relatively to the shell 10. The two groups of load rods or tension members at each end of the liquid vessel are arranged to correspond to elements of a conical surface and the rods are positioned with their outer ends inclined toward the rods of the opposite group. Such arrangement of the rods enables them effectively to resist forces tending to produce radial or longitudinal movement of the inner vessel relative to the insulation container in any and all positions of the liquid vessel. The angular relation of the load rods 26 and 27 with respect to the main axis of the liquid vessel is such that the tension in the load rods suspends the inner vessel within the shell 10 and produces endwise compression forces in the cylindrical portion 23 of the vessel. The cylindrical form of the portion 23 is well able to resist endwise forces in addition to the forces produced by the internal and external pressure difference which usually acts outwardly tending to maintain the cylindrical shape. The forces produced in the external shell are tensile and are distributed evenly by the channel rings 13. When the channel is evacuated it is under an external pressure and the tensile forces do not increase the instability of the shell or its ability to resist external pressure.

Figure 3:
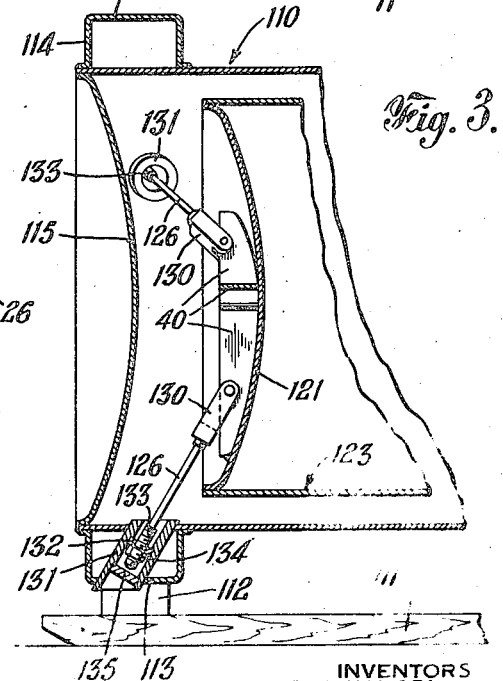
Fig. 3 is a fragmentary view of a longitudinal section illustrating another embodiment of the invention.

Referring to the embodiment illustrated in Fig. 3, there is shown a cylindrical outer shell 110 mounted by legs 112 on supporting skids 111 and having reenforcing ring channels 113 adjacent the ends of the shell 110. In this embodiment the construction at both ends of the container may be similar so that only one end is illustrated and described. The end of the shell 110 is closed by a dished head 115 which may be externally concave. The liquid vessel 123 is cylindrical and is provided with externally concave dished end heads 121. The dished end heads have three radially arranged reenforcing ribs 40 which are welded to the external concave wall of the heads 121. Three load rods 126 are employed which are secured at their inner ends to clevises 130 which in turn are pivotally connected to the ribs 40 at points spaced from the main axis of the liquid vessel. In this embodiment the rods 126 are also arranged to correspond to the elements of a conical surface having its axis substantially coinciding with the main axis of the container but with its apex directed inwardly of the container so that the rods 126 have their outer ends inclined toward the head 115. The outer ends of the rods 126 are secured to the shell 110 in a manner similar to the way in which the rods 26 are secured in the embodiment of Figs. 1 and 2, the corresponding parts of such securing means being designated by reference numerals similar to those used in Figs. 1 and 2 increased by 100.

In the embodiment of Fig. 3, it will be seen that the tension in the rods 126 is transmitted through the ribs 40 and the heads 121 to the cylindrical shell 123 to place tensional forces in the shell 123. Such tensional forces are counteracted by compressional forces in the outer shell 110. The inner vessel is adequately supported in any position of the container both radially and longitudinally and, due to securing the load rods at points spaced from the main axis, rotational forces are also adequately counteracted.

In both embodiments described it will be seen that the angular relation of the load rods permits them to be of greater length than if they were perpendicularly radial so that the resistance to heat flow along the load rods is increased. Since the load rods can be designed to resist tension forces only, they may be made of a minimum thickness, which also increases the resistance to heat flow therethrough. Finally, the arrangement provides a relatively small number of load rods to adequately resist forces in any direction so that the heat leak toward the inner vessel due to the supporting means is low.

Although specific embodiments of the invention have been described in detail, it will be obvious that alterations and substitutions can be made in the apparatus shown and that some of the features can be used without others, without departing from the spirit and scope of the invention. For example, the insulation means employed between the inner vessel and outer shell may be a high vacuum with highly polished surfaces on the external walls of the inner vessel and the internal walls of the shell, or the insulation means may be of the powder-in-vacuum type, or an atmospheric powder filling can be employed. The load rods in particular are preferably made of a material having high tensile strength and a relatively low thermal conductivity for high strength materials.

We claim:

1. In a double walled container for transporting and storing liquefied gases at low temperatures, said container having an inner liquid holding vessel and an outer shell about said inner vessel providing an insulating space between the inner vessel and the shell, said outer shell having a main axis which is substantially coincident with an axis of said inner vessel, means for supporting said inner vessel in substantially fixed relation to said outer shell comprising two groups of at least three elongated tension members each, the members of each group being arranged to correspond to spaced elements of a conical surface the axis of which substantially coincides with said main axis, the inner ends of said tension members being secured to said inner vessel, the outer ends of said members being secured to said shell, said tension members constituting the sole support for said inner vessel, and said groups acting solely in tension and in opposition to each other to hold said inner vessel in suspension in any position of said container; and means for adjustably securing the outer ends of said tension members at spaced points in said outer shell, said securing means being constructed and arranged to provide adjustment of the tension in said tension members and gas tight sealing of the securing means after such adjustment.

2. A double walled container according to claim 1, in which the inner ends of said tension members are secured to said inner vessel at points spaced from said main axis whereby forces tending to produce relative rotation between said inner vessel and shell are counteracted.

3. A double walled container according to claim 1, in which the inner vessel has externally convex wall surfaces to which said members are secured and the outer ends of the members of each group are inclined toward the opposite group, said inner vessel being maintained in compression by said opposed groups of tension members.

4. A double walled container according to claim 1, in which the outer shell is cylindrical, said inner vessel has a cylindrical portion and externally convex end wall surfaces to which said members are secured and in which the outer ends of the members of each group are inclined toward those of the opposite group, the cylindrical portion of said inner vessel being maintained in compression by said opposed groups of members and the cylindrical portion of said outer shell being correspondingly maintained in tension.

5. A double walled container according to claim 1, in which the outer shell is cylindrical, said inner vessel has a cylindrical portion and externally concave end wall surfaces to which said members are secured, the outer ends of the members of each group being inclined outward from the opposite group, said cylindrical portion of the inner vessel being maintained in tension by said opposed groups of members.

6. In a double walled container for transporting and storing liquefied gases at low temperatures said container having a cylindrical outer shell and a cylindrical inner vessel disposed substantially concentrically with said shell, there being an insulating space between said shell and the inner vessel, and said inner vessel having hemispherical ends, supporting means comprising a ring member secured externally to each hemispherical end of the inner vessel and concentrically with the axis of said inner vessel; a group of tension members pivotally secured to each of said ring members, said tension members of each group being mutually spaced radially and extending radially outwardly and also being inclined toward the members of the other group; and means for securing the outer ends of said tension members to spaced points in said shell, said securing means being constructed and arranged to permit individual adjustment of the tension in said tension members and gas-tight sealing of said securing means after adjustment.

ODD A. HANSEN.
WALLACE J. ANDERSON.

REFERENCES CITED

The following references are of record in the file of this patent:

UNITED STATES PATENTS

| Number | Name | Date |
| --- | --- | --- |
| 883,479 | Place | Mar. 31, 1908 |
| 1,661,659 | Gray | Mar. 6, 1928 |
| 1,866,517 | Heylandt | July 5, 1932 |
| 1,979,224 | Hansen et al. | Oct. 30, 1934 |
| 2,198,315 | Nyberg | Apr. 23, 1940 |
| 2,229,081 | Hansen et al. | Jan. 21, 1941 |
| 2,256,673 | Hansen | Sept. 23, 1941 |
| 2,361,635 | Koppel | Oct. 31, 1944 |

FOREIGN PATENTS

| Number | Country | Date |
| --- | --- | --- |
| 498,173 | France | Oct. 8, 1919 |